United States Patent [19]

Baker et al.

[11] Patent Number: 5,180,868

[45] Date of Patent: Jan. 19, 1993

[54] METHOD OF UPGRADING OILS CONTAINING HYDROXYAROMATIC HYDROCARBON COMPOUNDS TO HIGHLY AROMATIC GASOLINE

[75] Inventors: Eddie G. Baker; Douglas C. Elliott, both of Richland, Wash.

[73] Assignee: Battelle Memorial Institute, Richland, Wash.

[21] Appl. No.: 577,781

[22] Filed: Oct. 9, 1990

Related U.S. Application Data

[63] Continuation-in-part of Ser. No. 208,989, Jun. 20, 1988, abandoned.

[51] Int. Cl.$^5$ ............................................. C07C 1/00
[52] U.S. Cl. ..................................... 585/240; 208/49; 208/58; 208/67; 208/68; 585/242; 585/469
[58] Field of Search ..................... 208/49, 58, 67, 68; 585/240, 242, 469, 400

[56] References Cited

PUBLICATIONS

"Hydrocracking Condensed-Ring Aromatics Over Nonacidic Catalysts," Wu, et al, 9 pages, Hydrocracking & Hydrotreating Ward et al, (editors) 1975.

"Chemistry of Hydrocracking," Langlois et al., Chevron Research Co., Richmond, CA., 15 pages, Refining Petroleum for Chemicals, date unknown.

"Catalytic Hydrogenation and Hydrocracking of Fluoranthene: Reaction Pathways and Kinetics," Lapinas et al., Ind. Eng. Chem. Res., 1987, 26, 1026-1033.

"Hydrocracking Polycyclic Hydrocarbons over a Dual-Functional Zeolite (Faujasite)-Based Catalyst," Haynes et al, Ind. Eng. Chem. Process Des. Dev. 1983, 22, 401-409.

"Hydrocracking of a Coal Extract with Various Catalysts," Doughty et al, Dec. 19, 1985, 8 pages.

"Hydrodeoxygenation of 1-Naphthol: Activities and Stabilities of Molybdena and Related Catalysts," Vogelzang et al., Journal of Catalysts 84, 170-177 (1983).

"Chemistry of Catalytic Hydrodeoxygenation," E. Furmisky, Energy Research Laboratories, Catal. Rev.-Sci. Eng., 25(3) 421-458 (1983).

"Hydrodeoxygenation of 1-Naphthol Catalyzed by Sulfided Ni-Mo/$\gamma$-Al$_2$O$_3$: Reaction Network," Li, et al., 4 pages, AIChE Journal 1985.

Haider, Ghulam "Catalytic Hydrodeoxygenation of Coal-Derived Liquids and Related Oxygen-Containing Compounds," a dissertation submitted to the faculty of The University of Utah in partial fulfillment of the requirements for the degree of Doctor of Philosophy in Fuels Engineering, Department of Mining and Fuels Engineering, The University of Utah, Dec. 1981.

Skukla, Yagya Valkya "Catalytic Hydrodeoxygenation Studies of Aromatic Ethers, Phenols and Oxygen-Rich Synfuels," a dissertation submitted to the faculty of The University of Utah in partial fulfillment of the requirements for the degree of Doctor of Philosophy, Department of Mining and Fuels Engineering, The University of Utah, Aug. 1985.

Primary Examiner—Asok Pal
Attorney, Agent, or Firm—Klarquist, Sparkman, Campbell, Leigh & Whinston

[57] ABSTRACT

The present invention is a multi-stepped method of converting an oil which is produced by various biomass and coal conversion processes and contains primarily single and multiple ring hydroxyaromatic hydrocarbon compounds to highly aromatic gasoline. The single and multiple ring hydroxyaromatic hydrocarbon compounds in a raw oil material are first deoxygenated to produce a deoxygenated oil material containing single and multiple ring aromatic compounds. Then, water is removed from the deoxygenated oil material. The next step is distillation to remove the single ring aromatic compouns as gasoline. In the third step, the multiple ring aromatics remaining in the deoxygenated oil material are cracked in the presence of hydrogen to produce a cracked oil material containing single ring aromatic compounds. Finally, the cracked oil material is then distilled to remove the single ring aromatics as gasoline.

24 Claims, 3 Drawing Sheets

METHOD OF UPGRADING OILS CONTAINING HYDROXYAROMATIC HYDROCARBON COMPOUNDS TO HIGHLY AROMATIC GASOLINE

This invention was made with government support under Contract No. DE-AC06-76RLO 1830 awarded by the United States Department of Energy. The government has certain rights in this invention.

This is a continuation-in-part of Ser. No. 07/208,989, filed Jun. 20, 1988.

FIELD OF THE INVENTION

The present invention relates to methods for producing gasoline, and in particular, a method of upgrading oils containing hydroxyaromatic hydrocarbon compounds which are produced by various biomass and coal conversion processes to highly aromatic gasoline.

BACKGROUND OF THE INVENTION

Coal, wood and other biomass can be converted to liquid products by various thermochemical and biochemical processes. The liquids from coal and biomass conversion reactions generally contain hydroxyaromatic hydrocarbon compounds due to the high oxygen content of most biomass (40–50 wt % on a dry basis) and as such the liquids are not true hydrocarbons. This limits their ability to replace petroleum-derived fuels.

Oil produced by high-pressure catalytic liquefaction of wood and other biomass has been widely reported as being phenolic, with both single and multiple ring phenols present. The relative amounts of each are a function of the processing severity and the type of biomass. Oils produced by flash pyrolysis of biomass are even more highly oxygenated and are thermally unstable when subjected to hydrotreating. With additional catalytic treating, pyrolyzates can be converted to oils chemically similar to those produced by high-pressure, catalytic liquefaction, such as disclosed in our patent application Ser. No. 033,281 filed Apr. 2, 1987 and entitled Process for Upgrading Biomass Pyrolyzates, the disclosure of which is hereby incorporated by reference.

Similarly, certain coal conversion processes produce phenolic-type oils as a portion of the product or as a byproduct. Coal-derived oils that are primarily phenolic include low-temperature coal tar such as that produced as a byproduct from fixed bed coal gasifiers and coal liquids from low severity hydrogenation processes.

Another raw oil material which contains single and multiple ring compounds is derived from the black liquor byproduct of chemical pulping processes. Liquid-phase treatment of black liquors, from alkaline pulping, at 300°–350° C. in a reducing atmosphere results in the formation of a phenolic-type oil product, which separates out from an aqueous phase containing the inorganic constituents. Such a procedure is described by McKeough et al. in "Oil Production by High-Pressure Thermal Treatment of Black Liquors," *Oil Production from Black Liquors*, ACS Symposium Series #376, pp. 104–111 (1988).

The production of actual hydrocarbon fuels from the products of the various biomass and coal and wood conversion processes has remained an elusive goal despite decades of research. Processing research has included a number of techniques, none of which has been totally successful. Biochemical conversion of cellulosic materials to ethanol is probably one of the most advanced techniques. Although the ethanol can be blended into gasoline, it is not a true hydrocarbon and requires engine modifications to be used directly. The recovery of plant-produced hydrocarbons such as seed oils or latex have also been investigated as diesel oil substitutes, but remain experimental in nature. Hydrocarbons, albeit high molecular weight and of a polycyclic aromatic nature, can also be produced as a small byproduct of high-temperature biomass gasification.

Another approach has been single step processes of various biomass and coal and wood conversion products which have had limited success in producing substantial quantities of highly aromatic hydrocarbons. Since some of the heavy fossil fuels such as heavy oils, shale, and coal liquids have high concentrations of organo-oxygen compounds, hydrodeoxygenation in the presence of standard hydroprocessing catalysts, such as $Co-Mo/Al_2O_3$ and $Ni-Mo/Al_2O_3$, has been investigated. This single step process has not been that successful in producing highly aromatic gasoline because at low temperature the hydrodeoxygenation reaction is suppressed in favor of the hydrogenation reaction of existing aromatics, which is not only undesirable, but also a waste of hydrogen. Furthermore, hydrodeoxygenation reactions still leave multiple-ring aromatic compounds as undesirable end products.

Hydrocracking proceeds by a free radical mechanism when a non-acidic alumina supported catalyst is used. Here, too, results in producing substantial quantities of highly aromatic gasoline have been limited. Existing aromatic compounds become saturated, which is undesirable and a waste of hydrogen. Moreover, there is no convincing evidence of cracking multi-ring aromatics. Generally, although exhibiting some success, single step processes have not proven to be optimal for producing highly aromatic fuel.

Recent developments in direct liquefaction of biomass have focused on two processing environments: 1) high-pressure, catalytic systems requiring extended residence time at 300° C. to 400° C. and 2) flash pyrolysis systems which operate at higher temperatures (approximately 500° C.) and atmospheric pressure with short resident times (<1 second). Neither of these systems can produce hydrocarbons directly in any significant yield.

SUMMARY OF THE INVENTION

The present invention is a multi-stepped method of converting an oil produced by various biomass, black liquor and coal conversion processes containing primarily single and multiple ring hydroxyaromatic hydrocarbon compounds to highly aromatic gasoline.

According to this disclosure, the single and multiple ring hydroxyaromatic hydrocarbon compounds in a raw oil material are first deoxygenated to produce a deoxygenated oil material containing single and multiple ring aromatic compounds. Then, water is removed from the deoxygenated oil material. The next step is distillation to remove the single ring aromatic compounds as gasoline. In the following step, the multiple ring aromatics remaining in the deoxygenated oil material are cracked through the carbonium ion mechanism by contacting the tenate with a catalyst on an acidic support in the presence of hydrogen to produce a cracked oil material containing single ring aromatic compounds. Finally, the cracked oil material is distilled to remove the single ring aromatics as gasoline.

By performing the multi-stepped process, it is possible to maximize the yield of aromatic gasoline by removing a fraction from the system before the rings become saturated. Furthermore, hydrogen consumption is minimized by using it only to hydrodeoxygenate the hydroxyaromatics and to hydrocrack the polycyclic aromatics, and is not wasted on the saturation of aromatic compounds. The intermediate distillation step is particularly beneficial because different conditions and different catalyst types may be needed with the deoxygenation and cracking steps to achieve the best results.

The present invention incorporates the use of "dual function" catalysts, that is, catalysts with both a hydrogenation component and a cracking component. Specifically, strongly acidic supports for hydrocracking of the polycyclic aromatics are used. Single step processes have not used such catalysts. For example, hydrotreating uses pure alumina supports for the catalysts. Although pure alumina supports are mildly acidic, they are not commonly referred to as "acids", "strong acids" or "acid supports" because they are incapable of generating a range of surface carbonium ions. This capability is characteristic of "strong acid catalysts" as described in *Catalysis and Chemical Process* (eds. Pearce and Patterson), p. 107 (1981) and by others. By utilizing dual function catalysts, superior yields are obtained, especially because acidic-supported catalysts are used for hydrocracking. For the purpose of this application, the phrases "acidic support", "acidic-supported catalyst" and the like shall be understood not to refer to alumina supported catalysts which are only weakly acidic.

DETAILED DESCRIPTION

For purposes of this disclosure, gasoline is defined as a mixture of volatile hydrocarbons having an octane number of at least 60 such as is useful as a transportation fuel. Hydroxyaromatic hydrocarbon is defined as any aromatic hydrocarbon which contains a hydroxyl (—OH) group, including phenols, naphthols, alkylated phenols and naphthols, and other higher molecular weight analogs. Examples of hydroxyaromatic hydrocarbons include single ring phenolics, bridged multiple ring phenolics and condensed multiple ring versions of these compounds. Biomass is defined as plant tissue which typically contains lignocellulosic materials. Such plant tissue includes the tissue of woody and nonwoody plants, partially digested or reacted plant tissue of the type found in food processing waste, manure or peat, commercial grade cellulose, etc. Catalytic hydrocracking refers to cracking through the carbonium ion mechanism in the presence of hydrogen. Acidic supports of the catalysts used in hydrocracking refer to those which have a much higher acid strength than pure alumina and are thus capable of generating a range of surface carbonium ions. Such "strongly acidic" supports include faujasite-type zeolite (X or V) and silica-alumina.

Deoxygenation of single ring hydroxyaromatic hydrocarbon compounds produces single ring aromatics, which are desirable as high-octane components of gasoline. However, multiple ring aromatics (produced by deoxygenating multiple ring hydroxyaromatic hydrocarbon compounds) must be converted to lower molecular weight compounds to be included in gasoline. An intermediate separation step becomes important in the multi-step method. The yield of aromatic gasoline may be maximized by removing a fraction, specifically the single ring aromatics, from the system after deoxygenation and before hydrocracking, thereby preventing the rings from becoming saturated. Therefore, three distinct steps are required to upgrade raw oil containing hydroxyaromatic hydrocarbon compounds to gasoline: (1) deoxygenation; (2) distilling off desirable single ring aromatic compounds; and (3) cracking of multiple ring compounds.

Studies have shown that conventional sulfided $CoMo/Al_2O_3$ hydrotreating catalysts are the most effective catalysts for hydrodeoxygenation of the oil without hydrogenating the aromatic rings. However, conversion of multiple ring phenolic compounds to gasoline-range hydrocarbons is slow due to the difficulty in breaking the carbon-carbon bonds to produce gasoline hydrocarbons. As a result, low space velocities are required for high conversions.

Figure 1A:
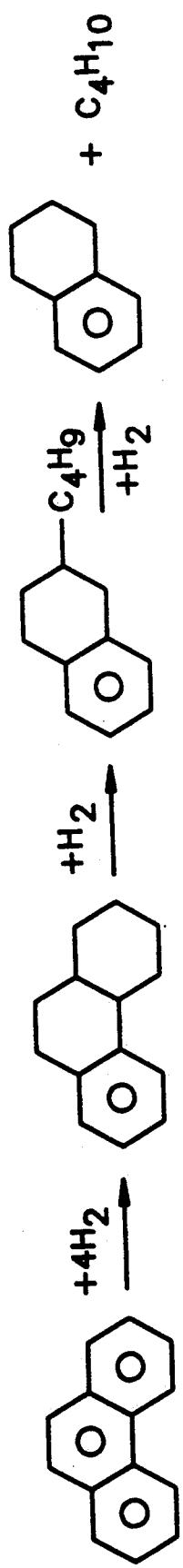
FIGS. 1A and 1B show the two probable reaction paths for the reaction of the present invention.
Figure 1B:
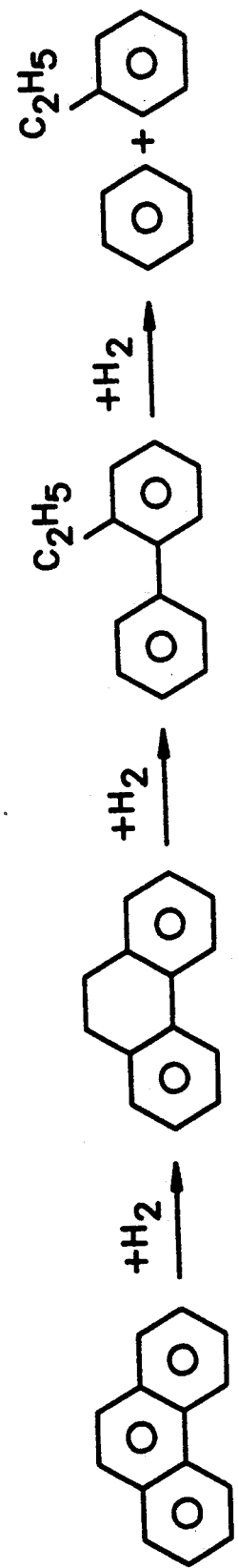

For example, for multiple ring hydroxyaromatic compounds, the initial step in the conversion process following deoxygenation and distillation is hydrogenation of one or more of the aromatic rings. After hydrogenation, two different primary reaction paths have been identified. FIGS. 1A and 1B show the paths for hydrocracking fused polycyclic aromatics such as phenanthrene ($C_{14}H_{10}$) In the reaction path shown in FIG. 1A, the hydrogenation is followed by opening the saturated ring to form an alkyl side chain. Cracking of the side chain would yield butane and Tetralin ($C_{10}H_{12}$), which can be further reacted to produce benzene and butane by the same mechanism (not shown). In the reaction path shown in FIG. 1B, ring saturation and cleavage of the central ring leads to production of two monocyclics, which can include benzene, toluene, ethyl benzene, cyclohexane, methyl cyclohexane, ethyl cyclohexane and similar compounds. Bridged phenolic compounds also follow the path in FIG. 1B after deoxygenation.

Hydrocracking means the combination of hydrogenation and catalytic cracking, that is, cracking through the carbonium ion mechanism. Carbonium ion formation requires high acid strength; therefore, an appropriate catalyst for hydrocracking has a high acid strength support. Alumina is not such a "strong acid catalyst."

The catalysts for hydrocracking polycyclic aromatics are "dual function," meaning that they contain both a hydrogenation component and a cracking component. The hydrogenation component is typically sulfided nickel-molybdenum, nickel-tungsten or cobalt-molybdenum. The cracking component as stated above must be strongly acidic and thus may be a faujasite-type zeolite (x or y), silica-alumina or similar compound. The zeolites are likely to be more active, but with polycyclics containing four or more rings, zeolites are likely to be sterically hindered by the small pores, and amorphous silica-alumina catalysts may be more active.

EXPERIMENTAL SYSTEM

Figure 2:
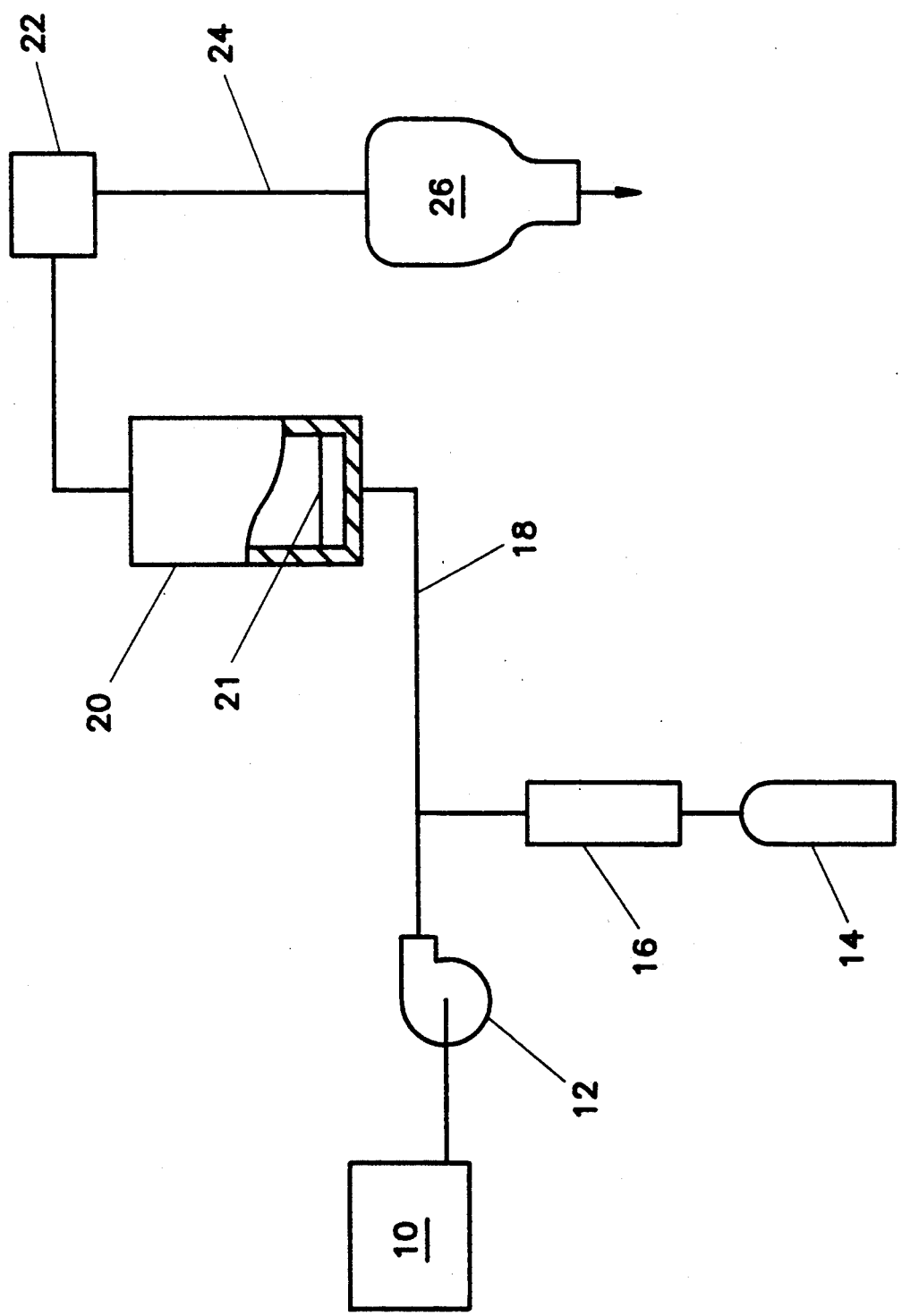
FIG. 2 is a schematic view of the experimental system used in connection with the present invention.

To test the above described method, the continuous feed, bench-scale reactor system shown in FIG. 2 was utilized. A biocrude raw oil feedstock was preheated to about 65° C. in feed reservoir 10 and transported by a high-pressure metering pump 12. Hydrogen from a high-pressure cylinder 14 was metered through a rotameter 16 and mixed with the raw oil in conduit 18 before entering pressure reactor 20. Pressure reactor 20 was approximately 7.5 cm inside diameter by 25 cm high. The reactor 20 held about 900 ml of catalyst supported on a stainless steel screen 21. The raw oil and gas enter through the bottom of the reactor 20.

Our calculations indicate that for the liquid and gas flow rates used in the tests, a two-phase flow pattern exists in reactor 20. Liquid moves through the reactor very slowly, in essentially plug flow. Gas flows through more rapidly, bubbling through the oil. Light products are removed in the vapor phase with the excess hydrogen. There should be essentially no carryover of liquid with the gas until the liquid level reaches the top of the reactor and overflows into product line. The pressure within the system was maintained using a back-pressure regulator 22, such as a Groves valve. Condensed product was recovered from the offgas stream 24 in knockout pot 26 and the gas was metered and analyzed before it was vented.

BATCHWISE RECYCLE OF HEAVY ENDS OF HYDROTREATED OIL

Three batchwise recycle experiments were performed using the same feedstock and different catalysts. The objective of the batchwise recycle tests was to determine the extent of gasoline production possible for the heavy product material upon recycle to the hydrotreating catalyst bed and to determine the extent of hydrocracking attainable in a secondary reactor containing a hydrocracking catalyst. The results of the experiments are summarized in TABLE I.

TABLE I

| Batchwise Recycle Test Results | | | |
|---|---|---|---|
| Hydrocrack Processing Conditions | Hydrotreat CoMo | Hydrocrack CoMo | NiMo |
| Temperature, °C. | 399 | 436 | 402 |
| Pressure, psig | 2020 | 2010 | 2050 |
| Oil Feed Rate, ml/hr | 299 | 289 | 303 |
| Hydrogen Feed Rate, L/hr | 200 | 180 | 190 |
| WHSV, wt oil/wt cat/hr | 0.48 | 0.65 | 0.46 |
| LHSV, vol oil/vol cat/hr | 0.35 | 0.34 | 0.36 |
| Yields | | | |
| Product Oil, L/L oil fed | 1.01 | 0.94 | 1.04 |
| C5-225° C., L/L oil fed | 0.56 | 0.81 | 0.67 |
| Deoxygenation, wt % | 76 | 78 | 83 |
| H2 Consumed, L/L oil fed | 268 | 272 | 241 |
| Carbon Conversion to Gas, wt % of C in oil fed | 5.1 | 9.1 | 2.8 |
| Material Balance | | | |
| Overall | 101 | 98 | 101 |
| Carbon | 102 | 98 | 101 |
| Oxygen | 102 | 103 | 94 |
| Hydrogen | 99 | 97 | 101 |

The feedstock used for the three tests was made up of products from earlier single-step process tests which were combined and stripped of light hydrocarbons (b.p. <160° C.) and water by distillation. It was a mixture of partially converted products which are representative of the material produced by a moderate hydrotreatment of wood oil. A comparison of the feedstock properties with those of the products of the three batch tests is shown in TABLE II.

TABLE II

| Feed Oil and Product Analyses | | | | |
|---|---|---|---|---|
| | Feed Oil | HT CoMo | HC CoMo | HC NiMo |
| Carbon, wt % | 86.4 | 88.4 | 88.6 | 88.3 |
| Hydrogen, wt % | 9.6 | 10.7 | 10.4 | 11.0 |
| Oxygen, wt % | 3.9 | 1.0 | 1.0 | 0.7 |
| H/C atomic ratio | 1.32 | 1.41 | 1.40 | 1.48 |
| Density, g/mL | 0.98 | 0.91 | 0.90 | 0.91 |
| Distillation, vol % | | | | |
| Gasoline, IBP-225° C. | 19.3 | 54.0 | 85.3 | 62.9 |
| Diesel, 225-300° C. | 35.4 | 31.7 | 8.1* | 26.9 |
| Gasoil, 300-384° C. | 24.0 | 12.9 | 7.0 | 9.6 |
| Atm Resid, >384° C. (wt %) | 24.7 | | | |

*distillation was suspended at 247° C., therefore diesel report is low

In the first run a hydrotreating CoMo catalyst was used at a reaction temperature of 399° C. In the second run a hydrocracking CoMo catalyst was used at a temperature of 436° C. A hydrocracking NiMo catalyst was used in the third run. By the use of the CoMo catalyst in the batchwise recycle tests we have approximated the conditions of a recycle system. By the use of the hydrocracking catalysts in the batchwise recycle tests, the new two-step hydrotreating/hydrocracking process of the present invention was tested.

The three experiments show good gasoline production for all three catalyst systems. The hydrocracking catalysts are more active toward the reduction of molecular weight of the oil and produce a higher yield of gasoline range material. The higher temperature test with the CoMo hydrocracking catalyst was especially successful in reducing the boiling range of the wood-derived oil. Almost all of the product falls in the gasoline and diesel boiling range with most of the product as gasoline. Gas formation from the processing is low in all cases as is the carbon laydown on the catalysts (5% to 10%).

These batchwise recycle test results are even more impressive when compared to single pass tests. As seen in TABLE III, the results are given for a single-stage process and the combination of the CoMo hydrotreating catalyst with each of the three secondary catalysts (either hydrotreating or hydrocracking). The combination of the CoMo hydrotreating catalyst with itself (hydrotreating/hydrotreating) is equivalent to the recycle operation.

TABLE III

| Comparison of Two-State and Single-Stage Results for TR-12 Oil | | | | |
|---|---|---|---|---|
| | Two-Stage Processing | | | Single-Stage Processing |
| Conditions | Hydrotreat CoMo | Hydrocrack CoMo | NiMo | |
| H2 Consumed, L/L oil feed | 500 | 503 | 481 | 575 |
| LHSV, vol oil/vol cat/hr | 0.19 | 0.19 | 0.19 | 0.05 |
| Gasoline Yield L/L oil feed | 0.62 | 0.80 | 0.70 | 0.61 |
| Temperature, °C. (1st/2nd stages) | 400/400 | 400/435 | 400/400 | 400 |
| Pressure, psig | 2000 | 2000 | 2000 | 2000 | hydrotreating first stage with CoMo catalyst

Comparison of the single-stage processing with the two-stage processing results in TABLE III shows the advantage of two-stage processing using the intermediate separation step. The two-stage hydrotreatment with intermediate separation (equivalent to a recycle system)

results in a 13% reduction in the hydrogen consumption for equivalent gasoline yield. The space velocity is increased by a factor of four. In the case of a two-stage process involving hydrotreating followed by hydrocracking there would be a 16% reduction in hydrogen consumption and a similar fourfold increase in the space velocity resulting in a gasoline yield increase of up to 30%.

In addition to the improvement in processing yields, there is also an improvement in the gasoline product composition. The oxygen content of the gasoline fraction (b.p. <225° C.) is near the limit of the detection system but appears to be less than 1%. The H/C ratio of the liquid product is lower as a result of the lower hydrogen consumption. Earlier single-step hydrotreated products from wood oil had H/C ratios of 1.65. These two-stage products are less than 1.5 H/C, which is indicative of a higher aromatic content (H/C=1.66 in the gasoline).

Figure 3:
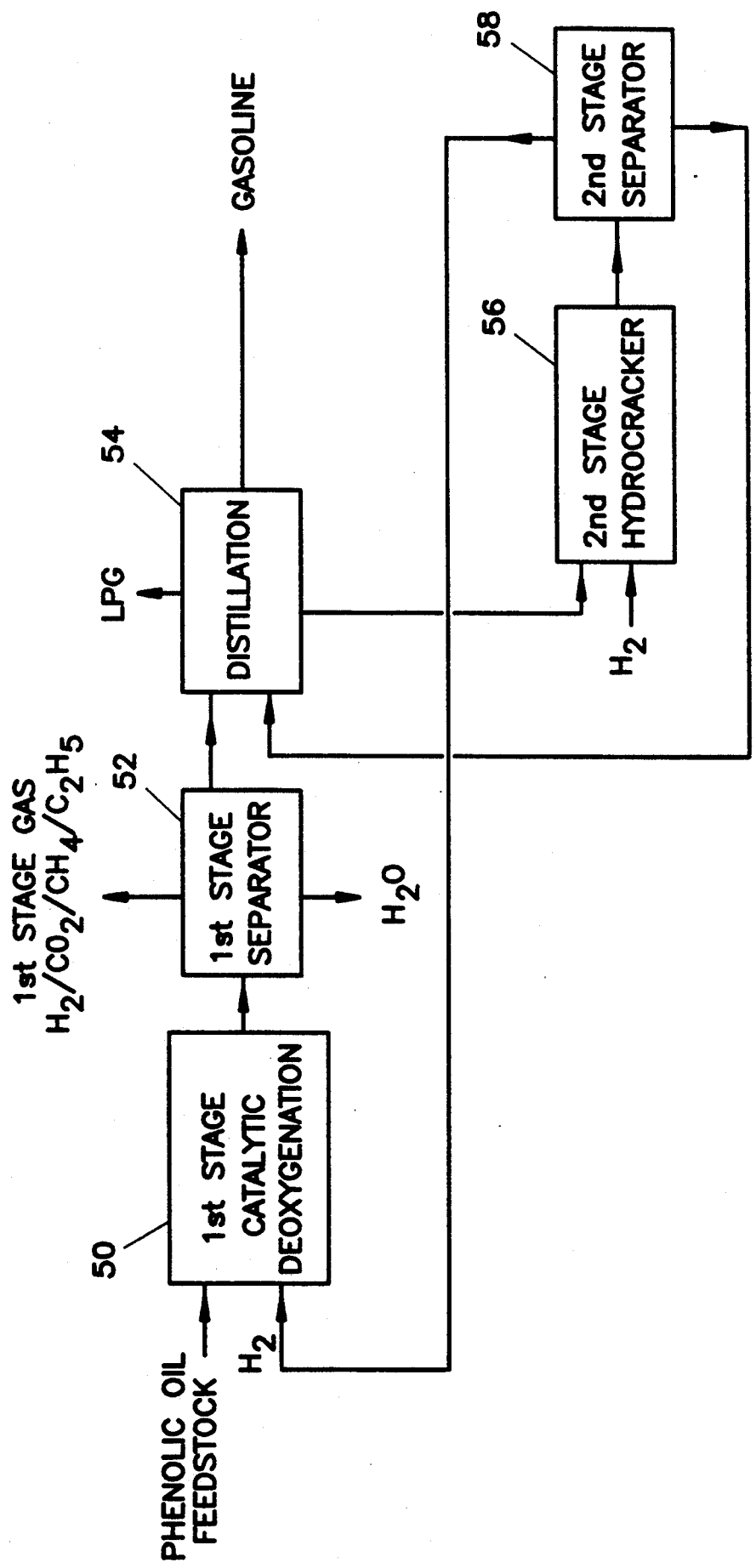
FIG. 3 is a block diagram showing a method of producing gasoline in accordance with the present invention.

As shown in FIG. 3, the first step in the present method is catalytic deoxygenation of a raw oil feedstock in a first stage deoxygenating reactor 50. The oil containing hydroxyaromatic hydrocarbon compounds may be produced by various wood or biomass conversion processes, such as high-pressure catalytic liquefaction, flash pyrolysis, catalytic treatment or pyrolyzates and coal conversion processes, including fixed bed coal gasification and coal liquids produced by low severity hydrogenation processes.

The catalytic deoxygenation is performed in the first stage reactor 50 in the presence of hydrogen at a pressure of between 1500 and 3000 psig and a temperature of between 300° and 450° C. Typical hydrotreating catalysts are used, typically sulfided cobalt-molybdenum on alumina.

The second step consists of collecting the now available desirable single ring components as follows:

A gravity separator 52 is used to separate water from the deoxygenated first stage product oil and then a highly aromatic gasoline, produced by the deoxygenation of the single ring components in the oil, is removed in distillation unit 54.

The remaining deoxygenated oil primarily containing polycyclic aromatics is delivered to a second stage hydrocracking reactor 56 for the third step of the process. The hydrocracking catalyst is sulfided nickel-molybdenum or sulfided cobalt-molybdenum on an acidic support such as faujasite zeolite or silica alumina. The catalyst is typically sulfided in the reactor vessel. The support may be either crystalline or amorphous silica alumina, high porosity alumina or alumina which contains a phosphate.

Operating conditions in the hydrocracker 56 are approximately 1500 to 3000 psig hydrogen pressure and a temperature of between approximately 300° and 450° C. The second stage product oil is delivered to a second stage gas/liquid gravity separator 58, where hydrogen gas is removed from the product stream for recycle to the first stage reactor 50.

If desired, the cracked product oil from the second stage separator 58 may be distilled with the first stage deoxygenated product oil. Combined gasoline from the two stages will be primarily aromatic and naphthenic and will have a high octane number, between 80 and 100.

Space velocities in the two reactors will vary depending on the quality of oil and the conversion required, but will generally be in the range of 0.1 to 1.0 volumes of oil processed per volume of catalyst per hour.

The present two-stage method for upgrading biomass-derived oils containing hydroxyaromatic hydrocarbon compounds has several advantages over conventional single-stage processes. For example, the first stage may be operated at less severe conditions to deoxygenate the oil while retaining the aromatic character of the gasoline. The separation of the water and the aromatic gasoline prior to the second stage is also beneficial since the water may physically degrade the cracking catalyst in the second stage and the aromatic gasoline from the first stage would be hydrogenated in the second stage, thus reducing its octane number and increasing unnecessarily the hydrogen consumption of the process. In addition, high severity operation is possible in the second stage reactor 56 to increase the rate of hydrocracking of the polycyclic aromatics. Catalyst life should also be extended.

Although preferred embodiments of the present invention have been shown, it is obvious that many modifications and variations of the invention are possible in light of the above teachings. It is therefore to be understood that the present invention may be practiced otherwise than as specifically described.

What is claimed is:

1. A multi-stepped method for producing highly aromatic gasoline, comprising the steps of:

deoxygenating unsaturated single and multiple ring hydroxyaromatic hydrocarbon compounds in a raw oil material at a temperature of 300° C.–450° C. so as to produce a deoxygenated oil material containing single and multiple ring aromatic compounds;

removing water from the deoxygenated oil material;

distilling the resulting deoxygenated oil material to remove single ring aromatic compounds as gasoline and leave a tenate;

after the distilling, cracking the multiple ring aromatic compounds remaining in the tenate in the presence of hydrogen and a dual function catalyst to produce a cracked oil material containing single ring aromatic compounds; and distilling the cracked oil material to remove the single ring aromatic compounds as gasoline.

2. The method of claim 1 wherein the raw oil material is wood-derived oil.

3. The method of claim 1 wherein the raw oil material is phenolic-type oil derived from black liquor.

4. The method of claim 1 further comprising catalytically liquefying biomass at an elevated pressure to produce the raw oil.

5. The method of claim 1 further comprising flash pyrolyzing biomass to produce the raw oil.

6. The method of claim 1 further comprising catalytically treating biomass pyrolyzates to produce the raw oil.

7. The method of claim 1 further comprising converting coal to produce the raw oil.

8. The method of claim 1 wherein the deoxygenated oil material further contains single and multiple ring naphthenic compounds.

9. The method of claim 1 wherein the hydroxyaromatic hydrocarbon compounds are deoxygenated using a deoxygenation catalyst.

10. The method of claim 9 wherein the deoxygenation catalyst is sulfided cobalt-molybdenum on alumina.

11. The method of claim 9 wherein the deoxygenation catalyst is sulfided nickel-molybdenum on alumina.

12. The method of claim 1 wherein the hydroxyaromatic hydrocarbon compounds are deoxygenated in the presence of hydrogen at a pressure of between approximately 1500 to 3000 psig and a temperature of between 300° C. and 450° C.

13. The method of claim 1 wherein the cracking of the multiple ring aromatic compounds is conducted in the presence of a cracking catalyst having a strongly acidic support.

14. The method of claim 13 wherein the cracking catalyst comprises sulfided nickel and molybdenum on a strongly acidic support.

15. The method of claim 13 wherein the cracking catalyst comprises sulfided cobalt and molybdenum on a strongly acidic support.

16. The method of claim 13 wherein the cracking catalyst includes a support comprising an alumina which contains a phosphate.

17. The method of claim 13 wherein the cracking catalyst includes a support comprising crystalline silica alumina.

18. The method of claim 13 wherein the cracking catalyst includes a support comprising amorphous silica alumina.

19. The method of claim 1 wherein the cracking catalyst includes a support comprising high porosity alumina.

20. The method of claim 1 wherein the multiple ring aromatic compounds are cracked at a pressure of between approximately 1500 and 3000 psig and at a temperature of between 300° C.-450° C.

21. The method of claim 1 wherein the single ring aromatic compounds and the multiple ring aromatic compounds are distilled simultaneously in a single distillation apparatus.

22. A multi-stepped method for producing highly aromatic gasoline, comprising the steps of:
deoxygenating unsaturated multiple ring hydroxyaromatic hydrocarbon compounds in a raw oil material at a temperature of 300° C.-450° C. to produce a deoxygenated oil material containing multiple ring aromatic compounds;
removing water from the deoxygenated oil material;
cracking the multiple ring aromatic compounds in the presence of hydrogen and a dual function cracking catalyst having a strongly acidic support to produce a cracked oil material containing single ring aromatic compounds; and
distilling the cracked oil material to remove the single ring aromatic compounds as gasoline.

23. A multi-stepped method for producing single ring aromatic compounds, comprising the steps of:
deoxygenating a raw material containing unsaturated multiple ring hydroxyaromatic hydrocarbon compounds at a temperature of 350° C.-450° C. to produce a deoxygenated material containing multiple ring aromatic compounds;
removing water from the deoxygenated material; and
cracking the multiple ring aromatic compounds in the deoxygenated material in the presence of hydrogen and a dual function cracking catalyst on a strongly acidic support to produce a material containing single ring aromatic compounds.

24. A multi-stepped method of producing highly aromatic gasoline, comprising the steps of:
deoxygenating unsaturated single and multiple ring hydroxyaromatic hydrocarbon compounds in a raw oil material, by contacting the material with a sulfided cobalt-molybdenum catalyst on an alumina support at a pressure of 1500 to 3000 psig and a temperature of 300° C. to 450° C., to produce a deoxygenated oil material containing single and multiple ring aromatic compounds;
removing water from the deoxygenated oil material;
distilling the resulting deoxygenated oil material to remove the single ring aromatic compounds as gasoline and leave a tenate;
after the distilling, cracking the multiple aromatic compounds remaining in the tenate, by contacting the tenate with a sulfided nickel and molybdenum catalyst on a silica alumina support in presence of hydrogen at a pressure of 1500 to 3000 psig and a temperature of 300° C. to 450° C., to produce a cracked oil material containing single ring aromatic compounds; and
distilling the cracked oil material to remove the single ring aromatic compounds as gasoline.

* * * * *